June 5, 1945.  F. T. COURT  2,377,760
GRAIN CONVEYER
Filed May 18, 1942  2 Sheets-Sheet 2
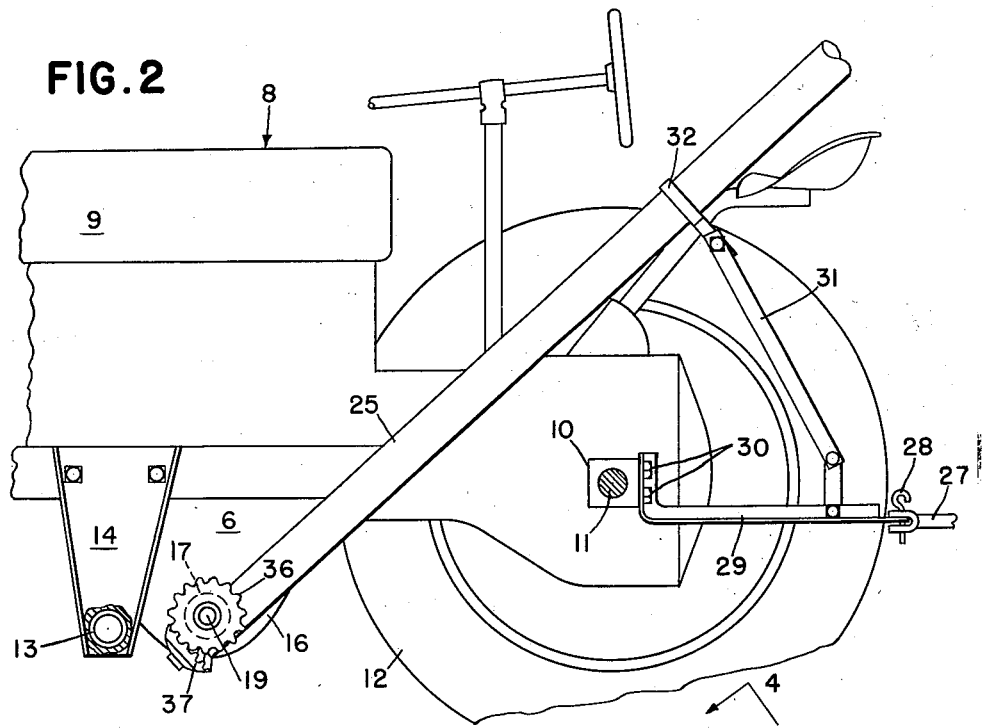
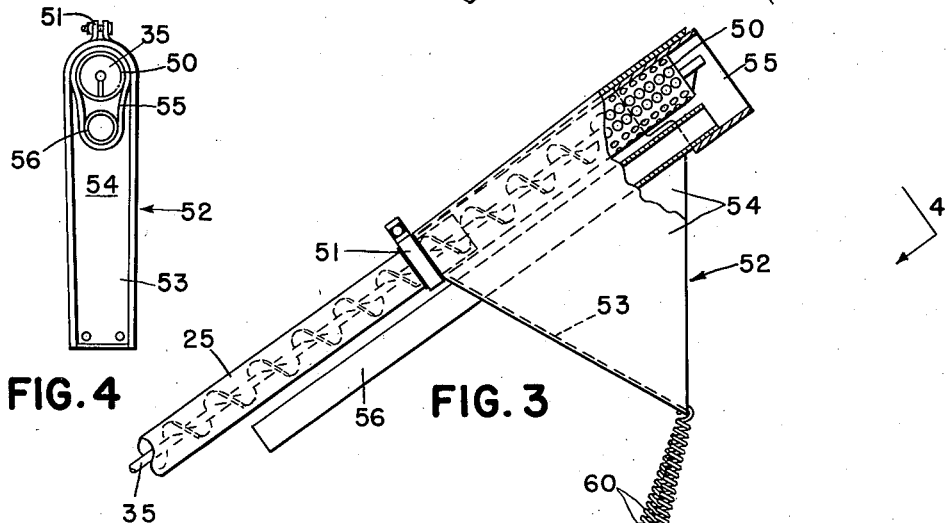
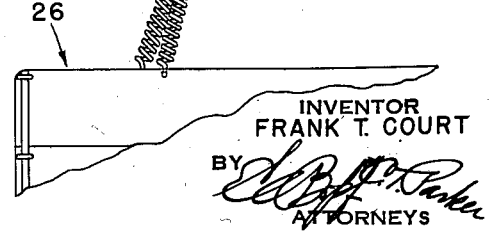
INVENTOR
FRANK T. COURT
BY
ATTORNEYS Patented June 5, 1945

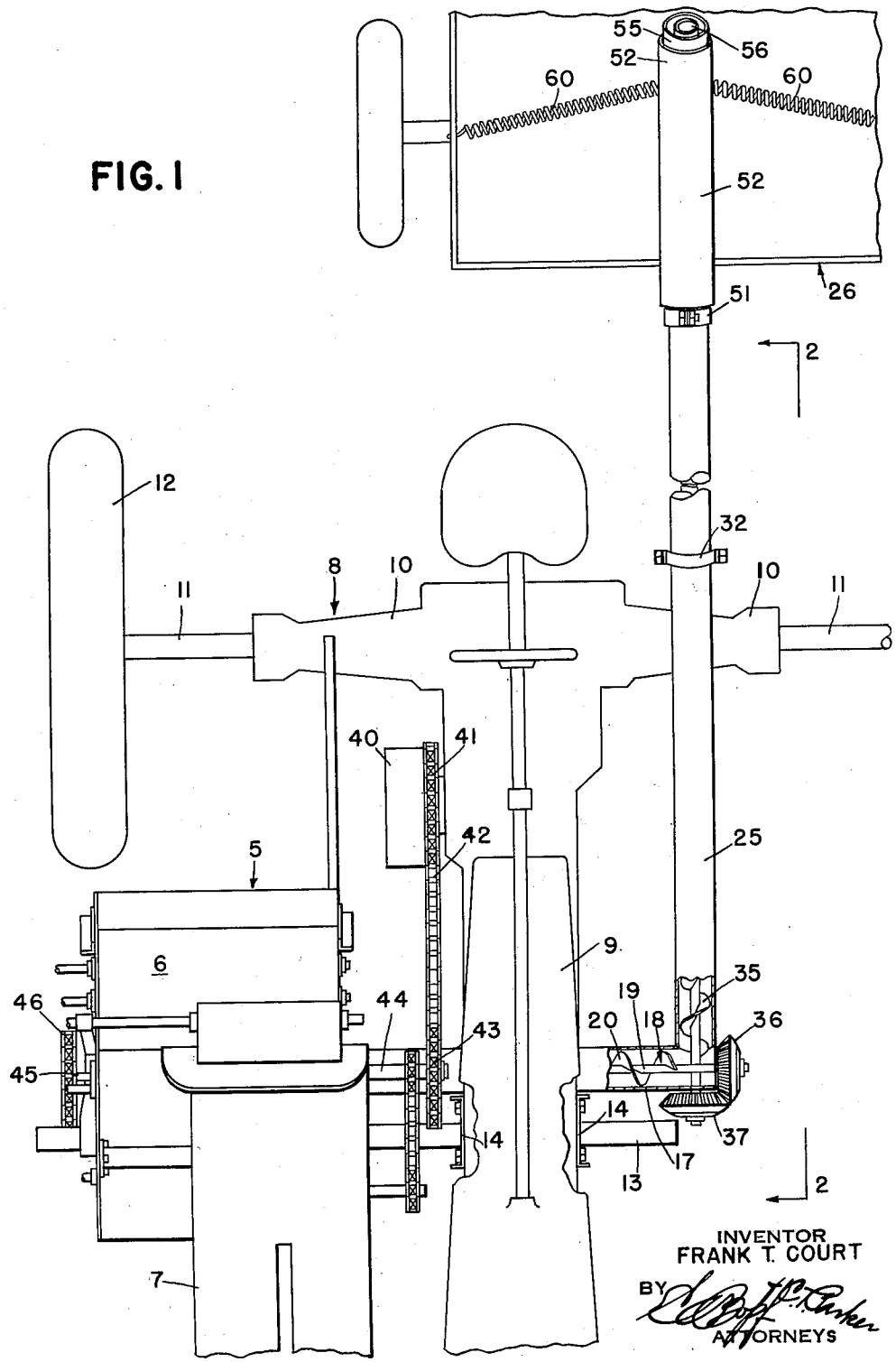

2,377,760

UNITED STATES PATENT OFFICE 2,377,760

GRAIN CONVEYER

Frank T. Court, Moline, Ill., assignor to Deere & Company, Moline, Ill., a corporation of Illinois Original application May 23, 1941, Serial No. 394,807. Divided and this application May 18, 1942, Serial No. 443,545

9 Claims. (Cl. 209—241)

The present invention relates generally to conveyers, and more particularly to grain conveyers for use on a harvesting machine for conveying grain from the latter and discharging it into a wagon or truck drawn alongside of the harvester. This application is a division of my co-pending application, Serial No. 394,807, filed May 23, 1941, now Patent 2,351,807, issued June 20, 1944.

The principal object of the present invention relates generally to the provision of a new and improved grain conveyer and elevator, which is simpler in construction, lighter, and less expensive than similar devices known to those skilled in the art, without sacrifice of efficiency or durability. In the accomplishment of this general object, I have provided an auger type conveyer receiving grain from the grain trough of a harvesting implement and conveying the same upwardly and rearwardly and discharging the grain into a suitable wagon.

A more specific object relates to the provision of a simple and inexpensive connection between two sections of the auger conveyer which are disposed in angular relation to each other, permitting one section of the auger to be driven from the other section.

A further object of my invention relates to the provision of a simple but efficient means for cleaning the grain just before the latter is discharged into the wagon, eliminating chaff and any pieces of stalks or leaves.

These and other objects and advantages of my invention will be apparent to those skilled in the art after a consideration of the following description in which reference is had to the drawings appended hereto, in which Figure 1 is a partial plan view of a tractor-mounted harvesting machine and a conveyer, embodying the principles of the present invention, for conveying grain from the harvester and discharging the same into a wagon drawn behind the tractor;

Figure 2 is a side elevational view taken along a line 2—2 in Figure 1;

Figure 3 is a side elevational view of the upper portion of the wagon elevator and the wagon, showing a portion of the grain cleaning device broken away to more clearly illustrate the details of construction; and Figure 4 is an end view of the grain cleaner taken along a line 4—4 in Figure 3.

Referring now to the drawings, the harvester, indicated in its entirety by reference numeral 5, is a corn harvester of the type shown and described in my above-mentioned co-pending application, although the present invention is not limited to any details of this machine. The harvester 5 is a corn picker and sheller, comprising a main housing 6 containing suitable corn shelling and cleaning mechanism, and a forwardly extending gathering device 7, mounted on the housing 6 and forming a unitary part thereof. The housing is mounted on a tractor 8 having a longitudinally extending body 9 carried on a transversely disposed rear axle housing 10, in which are journaled supporting axles 11, the latter being carried on traction wheels 12. The housing 6 is supported alongside of the longitudinally extending body 9 on a transverse pipe beam 13, which is rigidly secured by plates 14 to the sides of the tractor frame.

The kernels of corn, which are shelled from the cobs by the mechanism within the housing 6, fall into a trough 16 in the lower portion of the housing. A cylindrical conveyer tube 17, which forms a continuation of the transversely disposed trough 16, extends beneath the tractor body 9.

An auger 18 is disposed within the trough 16 and extends through the cylindrical conveyer tube 17. The auger 18 comprises a central shaft 19, on which is wound a helical blade 20, which fits slidably within the conveyer tube 17, in a manner well-known to those skilled in the art.

The forward end of a longitudinally extending conveyer tube 25 intersects the outer end of the transverse conveyer tube 17 and is rigidly fixed thereto, as by welding. The longitudinally extending tube 25 is inclined upwardly and rearwardly over the rear axle housing 10, and the rear end of the tube is disposed above a wagon 26, drawn behind the tractor by means of a drawbar 27, which is connected by a draft pin 28 to a drawbar 29 rigidly connected by bolts 30 to the rear axle housing 10. The conveyer tube 25 is supported in inclined position by means of a brace 31 connected at its lower end to the drawbar 29 and at its upper end to a bracket 32 on the tube 25. Within the tube 25 is rotatably disposed an auger 35, which is rotatable about an axis offset slightly below the axis of the transverse auger shaft 19, so that the two shafts cross each other without interference. The auger tube 25 is also offset a corresponding amount with respect to the transverse conveyer tube 17, and the two conveyer tubes are disposed in communication with each other at their intersection and the joints therebetween are sealed by the welding operation. Thus, the two auger shafts extend across the intersection of the tubes and are journaled in the end walls of the tubes. Each of the shafts extends beyond the tube walls to receive a beveled gear 36, 37, respectively. Bevel gears are rigidly fixed to the shafts of the augers 19, 35, and are disposed in intermeshing relation in order to transmit power from one of the augers to the other. I have found that if the diameters of the auger shafts are small with respect to the diameters of the gears 36, 37, the latter will intermesh for this purpose, regardless of the small amount of offset of the two axes.

Power for driving the harvesting mechanism and conveyers is obtained from the belt pulley 40 of the tractor, on which a sprocket 41 is detachably secured for this purpose. A drive chain 42 is trained over the sprocket 41 and also over a driven sprocket 43 on a shaft 44, which projects from the inner side of the housing 6. The opposite end of the shaft 44 projects from the outer side of the housing 6 and has a sprocket 45 attached thereto. The sprocket 45 drives a sprocket 46, which is fixed to the end of the transverse auger shaft 19, the latter being extended through the trough 16 and projecting through the outer wall of the sheller housing 6. Thus, the auger 35 is driven through the intermeshing bevel gears 36, 37 from the auger shaft 19, so that shelled kernels are conveyed from the housing 6 transversely through the conveyer tube 17 to the tube intersection, from whence kernels are propelled by the auger 35 upwardly and rearwardly through the inclined elevator tube 25.

A perforated tube section 50 fits snugly over the upper end of the tube 25 and is rigidly clamped thereto by means of a clamping bracket 51. The auger 35, however, extends upwardly beyond the end of the conveyer tube 25, through the perforated tube section 50, to move the kernels into the latter. The perforations in the tube section 50 are of sufficient size to permit the kernels of corn to drop therethrough, while retaining chaff, leaves and pieces of stalks and other trash, the latter being forced out of the upper end of the perforated section 50 by the auger 35.

The kernels fall from the perforations in the tube section 50 into a spout 52, which comprises a chute 53 disposed beneath the perforated tube section 50 and inclined downwardly and rearwardly from the lower end of the latter, and a pair of side walls 54, which extend upwardly from the side edges of the chute and curve over the top of the tube section 50 in joined relation. The spout 52 is not fixed rigidly to the tube section 50, but is free to swing laterally relative thereto, and is prevented from sliding axially down the tube by the clamping bracket 51, against which the spout abuts.

At the upper end of the tube section 50, a sleeve member 55 embraces the upper portion of the tube section and extends upwardly from the end of the latter and is enlarged at its lower end to hold the end of a trash discharge tube 56, which is disposed beneath the perforated tube section 50 and substantially parallel thereto. The sleeve member 55 serves not only to support the upper end of the trash discharge tube 56 but also serves to guide the trash from the upper end of the perforated tube 50 into the upper end of the trash discharge tube 56, through which the trash then slides forwardly and downwardly over the edge of the wagon 26 and out the lower end of the tube 56 from which it falls to the ground. The trash discharge tube 56 extends through a suitable aperture in the upper end of the chute 53, which serves to support the intermediate portion of the discharge tube 56. Inasmuch as the latter is of smaller diameter than the perforated tube section 50, the kernels of corn are permitted to drop over the tube 56 between the side walls 54 and onto the chute 53, over which they slide rearwardly into the wagon.

Since the inclined conveyer tube 25 is substantially rigid laterally with respect to the tractor, when the latter makes a turn, the upper end of the conveyer tube is swung laterally to one side or the other of the wagon 26. The spout 52, however, is swung laterally about the axis of the tube 25 when the tractor makes a turn, by means of a pair of coil springs 60, which are connected to the lower end of the spout 52 and to the opposite sides of the wagon, respectively. In this manner, the stream of kernels flowing through the spout 52 is directed into the wagon, regardless of the turning of the tractor.

I claim:

1. For use in a harvester or the like, a wagon elevator comprising in combination, a cylindrical tube having a perforated section at the outer end thereof, an auger conveyer rotatably supported in said tube, a sleeve over said perforated section and extending beyond the end of the latter, a spout fixed on said sleeve and connected in communication therewith at the lower end of said perforated section to receive grain from said perforated section for discharging the same into a wagon, and a trash discharge tube carried on said sleeve and disposed in communication with said extension of the latter to receive trash discharged from the end of said tube, said trash discharge tube extending downwardly along said elevator tube beyond said spout and supported on the latter to discharge the trash over the edge of the wagon.

2. For use in a harvester or the like, a grain conveyer comprising, in combination, a cylindrical tube inclined upwardly and adapted to overhang a wagon or the like, said tube having a perforated section adjacent the upper end thereof, an auger rotatably disposed in said tube, a spout carried beneath said perforated section for directing grain therefrom into the wagon, a trash discharge tube supported on and extending through an aperture in said spout and extending along said conveyer tube, and means connecting said trash tube at its upper end with the end of said conveyer tube to receive relatively coarse material therefrom and convey the same downwardly over the edge of said wagon.

3. For use in a harvester or the like, a grain conveyer comprising, in combination, an elevator tube inclined upwardly and adapted to overhang a container such as a wagon and having a perforated section adjacent the upper end thereof, means for moving grain or the like upwardly in said tube to fall through the perforations, a grain spout depending away from said tube below said perforated section to direct the grain falling therethrough into the wagon, a trash discharge tube disposed within said spout below said elevator tube and substantially parallel thereto, and means connecting said trash tube with the end of said conveyer tube to receive relatively coarse material therefrom and convey the same downwardly over the edge of the wagon, the bottom of said spout being apertured to receive said trash tube.

4. For use in a harvester or the like, a grain conveyer comprising, in combination, an elevator tube inclined upwardly and adapted to overhang a wagon and having a perforated section adjacent the upper end thereof, means for moving grain or the like upwardly in said tube to fall through the perforations, a grain spout comprising a chute disposed beneath said perforated section and inclined downwardly from the lower end of the latter and a pair of side walls extending upwardly from said chute and supported on said tube, a trash discharge tube disposed under said elevator tube extending between said side walls over said chute, and means connecting the upper end of said trash tube with the end of said elevator tube to receive coarser materials therefrom and conduct the same downwardly over the edge of the wagon.

5. For use in a harvester or the like, a wagon elevator comprising in combination, a cylindrical tube inclined upwardly and adapted to overhang a wagon or the like, said tube having a perforated section at the outer end thereof, an auger conveyer rotatably supported in said tube, a sleeve over said perforated section and extending beyond the end of the latter, a spout fixed on said sleeve and connected in communication therewith to receive grain from said perforated section for discharging the same into a wagon, said spout having side walls extending along the perforated section of said tube to guide grain to said spout, said sleeve and said spout being swingable relative to said tube about the axis of the latter, means connecting said spout to opposite sides of the wagon to hold the spout in position to discharge into the wagon when going around a turn, and a trash discharge tube extending downwardly along said elevator tube and supported on said sleeve, said trash discharge tube being connected in communication with the upper extension of said sleeve to receive trash from the end of said elevator tube and adapted to convey the same over the edge of the wagon.

6. For use in a harvester or the like, a grain conveyer comprising, in combination, an elevator tube inclined upwardly and adapted to overhang a wagon and having a perforated section adjacent the upper end thereof, means for moving grain or the like upwardly in said tube to fall through the perforations, a grain chute suspended beneath said perforated section by means providing for lateral swinging movement relative thereto, a trash discharge tube disposed beneath said perforated section and over said chute, the latter being apertured to receive and support said tube which extends from the upper end of said elevator tube downwardly through said chute to discharge trash over the edge of the wagon, means for swingably supporting the upper end of said trash discharge tube on said elevator tube and for conducting trash and coarser material from the upper end of said conveyer tube into said discharge tube, and means connecting said swingable chute to the wagon to swing said chute laterally when the harvester and wagon are making a turn, to hold the chute in proper position.

7. For use in a harvester of the type adapted to harvest crops in the field and load them into a trailing wagon or the like, a wagon elevator comprising, in combination, an elevator tube inclined upwardly and rearwardly and adapted to overhang a wagon during operation in the field, means for moving grain or the like upwardly in said tube, a grain chute disposed adjacent the upper end of said tube to receive the grain discharged from the tube and convey the same into the wagon, said chute being mounted on said tube by means providing for lateral swinging movement relative thereto, and a pair of tension springs attached at one end to said chute and having means for connecting the other ends in opposed relation to the sides of the wagon to swing said chute yieldably laterally when the harvester and wagon are making a turn, to hold the chute in proper position for discharging into the wagon during the turn.

8. For use in a harvester of the type adapted to harvest crops in the field and load them into a trailing wagon or the like, a wagon elevator comprising, in combination, a cylindrical conveyer tube inclined upwardly and adapted to overhang a wagon during operation in the field, means for moving grain or the like upwardly in said tube, a grain discharge chute disposed adjacent the upper end of said tube to receive the grain discharged from the tube and convey the same into the wagon, said chute having side walls interconnected by a curved top wall adapted to fit slidably over said tube and support said chute therefrom and providing for lateral swinging movement of said chute, and means for connecting said swingable chute to the wagon to swing said chute laterally when the harvester and wagon are making a turn, to hold the chute in proper position for discharging into the wagon during the turn.

9. For use in a harvester of the type adapted to harvest crops in the field and load them into a trailing wagon or the like, a wagon elevator comprising, in combination, a cylindrical conveyer tube inclined upwardly and adapted to overhang a wagon during operation in the field, means for moving grain or the like upwardly in said tube, a grain discharge chute disposed adjacent the upper end of said tube to receive the grain discharged from the tube and convey the same into the wagon, said chute having side walls interconnected by a curved top wall adapted to fit slidably over said tube and support said chute therefrom and providing for lateral swinging movement of said chute, and a pair of tension springs attached at one end to said chute and having means for connecting the other ends in opposed relation to the sides of the wagon to swing said chute laterally when the harvester and wagon are making a turn, to hold the chute yieldably in proper posision for discharging into the wagon during the turn.

FRANK T. COURT.

CERTIFICATE OF CORRECTION.

Patent No. 2,377,760.  June 5, 1945.

FRANK T. COURT.

It is hereby certified that error appears in the printed specification of the above numbered patent requiring correction as follows: Page 3, second column, line 16, claim 7, strike out the word "yieldably" and insert the same after "chute" in line 18, same claim; and that the said Letters Patent should be read with this correction therein that the same may conform to the record of the case in the Patent Office.

Signed and sealed this 18th day of September, A. D. 1945.

Leslie Frazer (Seal) First Assistant Commissioner of Patents.